United States Patent [19]

Martin

[11] 4,054,461

[45] Oct. 18, 1977

[54] METHOD OF CEMENTING

[75] Inventor: Robert C. Martin, Tulsa, Okla.

[73] Assignee: The Dow Chemical Company, Midland, Mich.

[21] Appl. No.: 763,732

[22] Filed: Jan. 28, 1977

Related U.S. Application Data

[62] Division of Ser. No. 670,331, March 25, 1976.

[51] Int. Cl.² ............................................. C04B 7/35
[52] U.S. Cl. ...................................... 106/89; 106/90; 106/110; 106/315; 166/293
[58] Field of Search ................. 106/89, 90, 110, 315; 166/293

[56] References Cited

U.S. PATENT DOCUMENTS

| | | | |
|---|---|---|---|
| 3,663,286 | 5/1972 | De Barrau | 106/89 |
| 3,723,145 | 3/1973 | Haldas et al. | 106/315 |
| 3,782,992 | 1/1974 | Uchikawa et al. | 106/89 |
| 3,891,454 | 6/1975 | Cunningham et al. | 106/89 |

*Primary Examiner*—J. Poer
*Attorney, Agent, or Firm*—G. H. Korfhage

[57] ABSTRACT

A cement composition is provided containing portland cement; calcium sulfate hemihydrate; an alkali metal nitrate; one or more retarders selected from the group consisting of a low molecular weight hydroxypolycarboxylic acid and sodium, potassium, and lithium salts thereof, and an alkaline hexametaphosphate; and as optional ingredients, calcium chloride and/or a condensation product of mononaphthalene sulfonic acid and formaldehyde; said ingredients being present in amounts effective to provide a cement which will set within a desired period of time at temperatures below about 80° F down to below freezing, e.g. 32° F, to provide a monolithic mass having adequate strength.

14 Claims, No Drawings

METHOD OF CEMENTING

CROSS-REFERENCE TO RELATED APPLICATION

This is a division, of application Ser. No. 670,331 filed Mar. 25, 1976.

BACKGROUND OF THE INVENTION

In many parts of the world, it is necessary to provide cement composition which will flow and set in low temperature or freezing environments. For example, in parts of the world it is desired to cement casing through permafrost regions where the temperature is below 32° F. One cement system developed for these purposes is disclosed by Holmgren et al. in U.S. Pat. No. 3,179,528. That composition consists of a mixture of portland cement, gypsum, an aqueous solution of a lower aliphatic alcohol as a freeze depressant and glue size to control the pumpability time at temperatures below freezing. One drawback to this cement system is the fact that increased temperatures reduce the pumping time so that the cement must at all times be kept at low temperatures, i.e. approximately at freezing point of water and below. Because of this characteristic short pumping time at elevated temperatures, special cementing procedures and equipment must be employed in cementing, for example, borehole casing in wells which are drilled through permafrost and then into areas reaching elevated temperatures, for example, 100° F or greater. In these particular situations, a by-pass tool must be employed to prevent the freeze protected cement from entering into the higher temperature zones wherein it may set up and prevent further cementing operations on the well.

Other art which is relevant to the present invention are Federal Republic of Germany Pat. Nos. 706,404, 936,673, and 936,318; and U.S. Pat. Nos. 3,071,481 (Beach et al.), 3,582,376 (Ames), 3,782,992 (Uchikawa et al.), and 3,891,454 (Cunningham et al.). In a commonly assigned copending application of Duane L. Stude and Earl F. Morris, Ser. No. 438,492 filed Jan. 31, 1974, it is disclosed that compositions similar to those of Cunningham et al. can be pumped through warm zones above 80° F and thence into cooler zones, e.g. below freezing, where the compositions will set. A low temperature cement composition containing urea is disclosed in another commonly assigned copending application by Duane L. Stude, Ser. No. 662,666, filed Mar. 1, 1976, now U.S. Pat. No. 4,036,659 issued July 19, 1977.

The present invention comprises a cement composition which, upon addition of water, forms a slurry which sets up at low temperatures, i.e. below 80° F to below freezing, within a suitable period of time to provide a monolithic mass having adequate compressive strength. The invention also comprises a method of cementing under such temperature conditions.

SUMMARY OF THE INVENTION

The cement composition of the present invention comprises a mixture of portland cement and gypsum in plaster of Paris form, i.e., calcium sulfate hemihydrate (hereinafter referred to simply as "gypsum"), wherein the weight ratio of portland cement to gypsum ranges from 3:1 to 1:3 portland cement:gypsum. Also included, as percent by weight of said mixture of portland cement and gypsum, is from about 5 to about 25 percent an alkali metal nitrate; from about 0.1 to about 2 percent of one or more retarders selected from the group consisting of a low molecular weight hydroxypolycarboxylic acid, and sodium, potassium, and lithium salts thereof, and an alkaline (i.e. sodium or potassium) hexametaphosphate; and, as an optional dispersant, from about 0.1 to about 1.5 percent of the condensation product of mononaphthalenesulfonic acid and formaldehyde and/or the alkali metal or ammonium salt thereof. Optionally, the cement composition contains from about 0.5 to about 6 percent calcium chloride (calculated as the dihydrate) based on the weight of the portland cement-gypsum mixture. To provide a cement slurry there is added, as percent by weight of the portland cement-gypsum mixture, from about 25 to about 50 percent water.

The method of the present invention comprises emplacing the cement composition in a freezing environment, i.e. one which would cause water to freeze, and permitting the cement to set up within a suitable period of time, such as in a borehole penetrating permafrost. By suitable period of time is meant that the cement sets up before it freezes, which would reduce its strength, and that the time required for the cement to set does not result in a commercially unreasonable waiting period.

The cement compositions of the present invention can be employed in environments wherein the cement is subjected to low temperatures ranging from about 80° F and lower, even to below freezing. The exact temperature variations which can be encountered will depend on such factors as the exact cement composition, permissible pumping time and the like.

DETAILED DESCRIPTION OF THE PRESENT INVENTION

The cement composition of the present invention preferably contains a mixture of portland cement and gypsum, in plaster of Paris form, in a weight ratio ranging from about 1:1 to about 1:3 (portland cement:gypsum). Based on the weight of the above mixture there is also preferably present in said composition, from about 5 to about 15 percent sodium nitrate; from about 0.3 to about 0.7 percent by weight of the above defined condensation product as a dispersant; from about 0.1 to about 0.5 percent citric or tartaric acid or sodium salts thereof or mixtures thereof, and most preferably from about 0.2 to about 0.4 percent citric acid or sodium citrate, to retard the setting of the cement; from about 1 to about 3 percent calcium chloride (calculated as the dihydrate) which serves to further enhance the depression of the slurry freezing point, to extend the thickening time at the lower temperatures, and to improve early strengths of the set cement; and to form a slurry, from about 35 to about 45 percent by weight water.

Any grade of portland cement can be employed in the practice of the present invention. The exact quantity and ratio of portland cement to gypsum in any particular composition may vary slightly depending on the type of portland cement employed and also upon the source of a particular type of cement, since small variations exist in cements obtained from different sources depending on raw materials, manufacturing procedures and the like.

Plaster of Paris form of gypsum should be employed in the practice of this inventin. Plaster of Paris is also known as calcined gypsum and calcium sulfate hemihydrate. As used herein, "alkali metal nitrate" refers to each of lithium, sodium, and potassium nitrate, including mixtures thereof. Of the alkali metal nitrates, sodium nitrate is preferred for use herein, particularly because it is generally most readily available.

Suitable retarders are low molecular weight—i.e., 6 carbon atoms or less—hydroxypolycarboxylic acids and lithium, sodium, and potassium salts thereof, as well as alkaline hexametaphosphates. Illustrative of such retarders are sodium, lithium and potassium citrate or tartrate and sodium hexametaphosphate. Water soluble salts of lignosulfonic acid, which were taught to be suitable as retarders by Cunningham et al. in U.S. Pat. No. 3,891,454 and by Stude and by Stude et al. in the above mentioned copending applications, are not effective to retard the cement described herein. Small amounts of such salts in combination with the retarders described herein, however, do not appear detrimental to the present cement.

There is also optionally included in the composition of the invention the condensation product of mono-naphthalene sulfonic acid and formaldehyde or the alkali or ammonium salt thereof (hereinafter referred to as naphthalene sulfonate product) when desired to promote proper dispersion, particularly as where a well contains fluids which may be somewhat incompatible with the basic cement composition described herein. The condensation product has the probable formula:

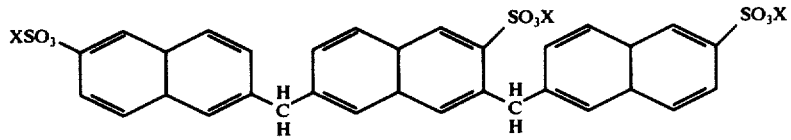

wherein X is an alkali metal or ammonium. This material is prepared by well known condensation reactions such as described by Tucker et al. in U.S. Pat. No. 2,141,569, the teachings of which are specifically incorporated herein by reference. The dispersant, also known as a densifier, may also contain additives such as polyvinylpyrrolidone, as described in U.S. Pat. No. 3,359,225.

The composition of the present invention may be employed in a novel method of cementing in freezing environments and in environments having near freezing (e.g. 32°–45° F at about 1 atmosphere pressure) temperature zones such as in permafrost zones and in zones underlying permafrost zones located in boreholes drilled to recover petroleum products such as gas and oil from subterranean formations. In the practice of the present invention the composition as hereinbefore defined is typically prepared at the surface and pumped down through tubing or casing through a zone which is below freezing, e.g. the permafrost zone, and then through a zone which is of a higher temperature, and back up the annulus existing between the borehole and the tubing into the zone which has a temperature below freezing, e.g. the permafrost zone, wherein it is maintained until it has set. The cement slurry may be forced into the permafrost zone by a second cement slurry which is designed to set up in said higher temperature zone within a reasonable period of time and said second slurry is permitted to set up in said higher temperature zone.

It is necessary to prepare a composition of the invention which will maintain a sufficient pumping time to enable the composition to be pumped into place before it sets up. The required pumping time will vary depending on the depth of a well, the temperature gradient of the well and the like. The invention can be practiced anywhere that it is desired to cement in a low temperature zone, even below freezing. It will be understood, of course, that the extent of freeze protection of a particular composition of the present invention will differ somewhat from that of other variations still within the scope of the invention.

The particular pumping characteristics of any specific composition can be determined by testing samples of compositions according to such procedures as those recommended in the American Petroleum Institute Recommended Practices published under API RP 10B designations.

Other constituents having known functional characteristics can be employed in the compositions of the present invention for their known function in hydraulic cements. These include, for example, weighing agents, loss circulation additives, such as gilsonite, graded coal, walnut shells, extenders, such as sand, fly ash, pozzolana, bentonite and the like.

EXAMPLES

In the following examples, a basic cement composition was employed containing, as percent by weight, 60 percent plaster of Paris and 40 percent portland cement (Class G). To the basic cement composition were added various other constituents, as indicated in Table I. The amount of constituent added is reported in terms of parts by weight of additive in the slurry. Since the parts by weight of the basic cement composition totals 100, the number for each additive also conveniently represents the amount of additive in terms of the percent by weight of the total weight of plaster of Paris and portland cement in the composition.

Various properties of samples of cement slurries were determined following the procedures set forth in the API Recommended Practice for Testing Oil-Well Cements and Cement Additives, API RP 10B, Eighteenth Edition, April, 1972. The tests were conducted following the API recommended procedures as closely as possible except for the initial temperature of the constituents employed in the cement compositions. In all the tests the initial temperature of the compositions was maintained below 80° F to obtain slurry temperatures which are typical of low temperature conditions found in areas where permafrost conditions exist. The various properties tested included thickening time, compressive strength and free water separation.

Thickening time tests were conducted with an Atmospheric Pressure Consistometer which had been modified with internal cooling coils. These coils allowed cold fluid to be circulated so as to maintain a constant low temperature. After the consistometer had been cooled to the desired temperature, the slurry was mixed and poured into a precooled slurry container. The test was then run while maintaining the desired temperature throughout the test. The test was terminated when the slurry reached 70 units of consistency ($U_c$). Results are reported in Table I as hours:minutes.

Strength of various samples of set cement was determined following the API atmospheric pressure curing procedure except that the slurry, at the desired temperature, was poured into a precooled mold. After the mold was properly filled and covered, it was immediately immersed in a curing bath. If other than water was used as the curing fluid, the filled molds were placed in fluid tight plastic bags to prevent slurry contamination which could possibly produce erroneous results. A water-ethylene glycol mixture was used as the curing fluid in most of the tests.

The amount of free water which separated from slurry samples was determined following the API recommended procedures as closely as possible. The test slurries were mixed so the initial slurry temperature was the same as the test temperature. After stirring in the atmospheric pressure consistometer for the recommended 20 minutes at the test temperature, the slurries were poured into 250 ml graduated cylinders. The cylinders were then submerged in a refrigerated bath maintained at the test temperature for two hours at which time water separation readings were taken.

The compositions and test results are summarized in Table I.

based on the total weight of said portland cement and gypsum:
   a. from about 5 to about 25 percent alkali metal nitrate;
   b. from about 0.1 to about 2 percent of at least one retarder selected from the group consisting of
      1. a low molecular weight polycarboxylic acid,
      2. a sodium, potassium, or lithium salt of a low molecular weight polycarboxylic acid, and
      3. an alkaline hexametaphosphate; and
   c. from about 25 to about 50 percent water.

2. The method of claim 1 wherein the environment is a borehole penetrating the low temperature zone to be cemented.

3. The method of claim 2 wherein the borehole extends through a permafrost zone sufficiently deeply so that the borehole has a higher temperature zone above 32° F, comprising pumping the slurry through the permafrost zone before permitting the slurry to set up in said permafrost zone.

4. The method of claim 1 wherein the alkali metal nitrate is sodium nitrate.

5. The method of claim 4 wherein the slurry contains from about 5 to about 15 percent sodium nitrate and Table I Properties of Compositions Containing, by Weight 60 Parts $CaSO_4 \cdot 1/2H_2O$
40 Parts Class G Portland Cement, and Various Additives in the Quantities Indicated

| Required | | | Additives Optional | | | | Test Results (Blanks indicate Test not Run) | | | | | |
|---|---|---|---|---|---|---|---|---|---|---|---|---|
| | | | Calcium Ligno-sulfonate | Dispersant (Sodium Naphthalene Sulfonate Product) | $CaCl_2 \cdot 2H_2O$ | NaCl | Thickening Times to 70U$_c$ at 40° F[2] | Compressive Strength, PSI[3] | | | | Water Separation at 40° F ml. |
| Water | NaNO$_3$ | Retarder[1] | | | | | | 20° F | | | 40° F | |
| | | | | | | | | 16 hrs | 20 hrs | 24 hrs | 16 hrs | |
| 36 | 5.4 | 0.4 Cit A | — | 0.3 | — | 1.8 | — | — | — | — | — | 1.6 |
| 36 | 7.2 | 0.2 NaCit | — | 0.3 | — | 1.8 | 2:14 | — | — | — | — | — |
| 36 | 7.2 | 0.3 NaCit | — | 0.3 | — | 1.8 | — | 812 | — | — | 761 | 0.8 |
| 36 | 7.2 | 0.3 Cit A | — | 0.3 | — | 1.8 | — | 902 | — | — | — | — |
| 36 | 7.2 | 0.4 Cit A | — | 0.3 | — | 1.8 | — | — | — | — | — | 1.8 |
| 37 | 7.4 | 0.4 Cit A | — | 0.3 | 1.85 | — | 4:06 | — | — | 1155 | — | 1.0 |
| 37 | 7.4 | 0.4 NaCit | — | 0.3 | 1.85 | — | 4:06 | — | — | 1250 | — | 1.0 |
| 38 | 5.7 | 0.4 Cit A | — | 0.3 | — | 1.9 | — | — | — | — | — | 1.7 |
| 38 | 7.6 | 0.3 Cit A | — | 0.3 | — | 1.9 | — | 800 | — | — | — | — |
| 38 | 7.6 | 0.3 NaCit | — | 0.3 | — | 1.9 | — | 691 | — | — | 676 | — |
| 38 | 7.6 | 0.4 Cit A | — | 0.3 | — | 1.9 | — | — | — | — | — | 2.0 |
| 40 | 6 | 0.3 Cit A | — | 0.3 | — | 2.0 | — | — | (300) | — | — | — |
| 40 | 6 | 0.4 Cit A | — | 0.3 | — | 2.0 | — | — | — | — | — | 1.6 |
| 40 | 6 | 0.5 Cit A | — | 0.3 | — | 2.0 | 5:30 | — | (47) | — | — | — |
| 40 | 8 | 0.1 Cit A | 0.8 | 0.3 | — | 2.0 | 2:42 | — | — | — | — | — |
| 40 | 8 | 0.3 NaCit | — | — | — | 2.0 | — | 660 | — | — | 568 | — |
| 40 | 8 | 0.3 NaCit | — | 0.3 | — | 2.0 | — | — | — | — | — | 1.2 |
| 40 | 8 | 0.3 Cit A | — | 0.3 | — | 2.0 | — | 733 | — | — | — | — |
| 40 | 8 | 0.3 Cit A | — | 0.3 | 2.0 | — | 3:17 | — | — | — | — | — |
| 40 | 8 | 0.3 NaCit | — | 0.3 | 2.0 | — | 4:10 | — | — | 935 | — | — |
| 40 | 8 | 0.3 NaTar | — | 0.3 | 2.0 | — | 4:45 | — | — | 818 | — | — |
| 40 | 8 | 0.4 Cit A | — | 0.3 | — | 2.0 | — | — | — | — | — | 1.9 |
| 40 | 8 | 0.4 Cit A | — | 0.3 | 2.0 | — | 5:54 | — | — | — | — | — |
| 40 | 8 | 0.4 NaCit | — | 0.3 | 2.0 | — | 5:06 | — | — | 920 | — | — |
| 40 | 8 | 0.4 NaTar | — | 0.3 | 2.0 | — | +6:00 | — | — | 299 | — | — |
| 40 | 8 | 0.5 Cit A | — | 0.3 | — | 2.0 | +6:00 | — | — | — | — | — |
| 40 | 12 | 0.5 Cit A | — | 0.3 | — | — | 4:10 | — | — | — | — | — |
| 40 | 12 | 0.5 Tar A | — | 0.3 | — | — | 4:15 | — | — | — | — | — |

Notes
[1] The various retarders employed are abbreviated as follows: Cit A = Citric Acid  NaCit = Sodium Citrate  NaTar = Sodium Tartrate  Tar A = Tartaric Acid
[2] "+" preceding entry indicates test was discontinued at time indicated and sample had not yet attained 70 U$_c$.
[3] Samples in parentheses froze prior to setting up at the particular temperature.

What is claimed is:

1. A method of cementing the low temperature zone of an environment having a low temperature zone below about 80° F, which comprises providing a cement slurry, transporting said slurry to said low temperature zone, and permitting the slurry to set up in said low temperature zone, wherein the slurry comprises portland cement and the calcium sulfate hemihydrate form of gypsum in a weight ratio of from 3:1 to 1:3 and, from about 35 to about 45 percent water, based on the total weight of the portland cement and gypsum.

6. The method of claim 1 wherein the retarder is citric acid or sodium citrate.

7. The method of claim 1 wherein the slurry contains, in addition, from about 0.5 to about 6 percent calcium chloride, calculated as the dihydrate, based on the weight of the portland cement and gypsum.

8. The method of claim 1 wherein the slurry contains, in addition, based on the total weight of the portland cement and gypsum, from about 0.1 to about 1.5 percent of a dispersant comprising a condensation product of mononaphthalenesulfonic acid and formaldehyde, one or more alkali metal or ammonium salt derivatives thereof, or mixtures of said condensation product and any of its recited derivatives.

9. The method of claim 8 wherein the slurry contains, in addition, from about 0.5 to about 6 percent calcium chloride, calculated as the dihydrate, based on the weight of the portland cement and gypsum.

10. The method of claim 8 wherein the portland cement in the slurry is a Class G portland cement and the weight ratio of portland cement to gypsum is 1:1 to 1:3, and wherein the following components are provided in the slurry in the amount specified, based on the total weight of the portland cement and gypsum: sodium nitrate about 5 to about 15 percent; calcium chloride, expressed as the dihydrate, about 1 to about 3 percent; and the dispersant, about 0.3 to about 0.7 percent.

11. The method of claim 10 wherein the retarder is citric acid or sodium citrate, and wherein it is provided in the slurry in an amount of from about 0.2 to about 0.4 percent by weight of said portland cement and gypsum.

12. The method of claim 10 wherein the environment is a borehole penetrating the low temperature zone to be cemented.

13. The method of claim 12 wherein the borehole extends through a permafrost zone sufficiently deeply so that the borehole has a higher temperature zone above 32° F, comprising pumping the slurry through the permafrost zone into the higher temperature zone, and then back into the peramfrost zone before permitting the slurry to set up in said permafrost zone.

14. The method of claim 13 wherein the retarder is citric acid or sodium citrate and wherein it is provided in the slurry in an amount of from about 0.2 to about 0.4 percent by weight of said portland cement and gypsum.

* * * * *